(12) United States Patent
Ferreira et al.

(10) Patent No.: US 8,773,747 B2
(45) Date of Patent: Jul. 8, 2014

(54) ELECTROCHROMIC DEVICE AND METHOD FOR PRODUCING SAME

(75) Inventors: Isabel Maria Mercês Ferreira, Sobreda (PT); Cláudia Brito Da Costa, Costa da Caparica (PT); Elvira Maria Correla Fortunato, Caparica (PT); Rodrígo Ferrão de Paiva Martins, Caparica (PT); Inês Domingues da Silva Henríques, Algés (PT)

(73) Assignee: YD Ynvisible, S.A., Cartaxo (PT)

( * ) Notice: Subject to any disclaimer, the term of this patent is extended or adjusted under 35 U.S.C. 154(b) by 0 days.

(21) Appl. No.: 13/378,704

(22) PCT Filed: Jun. 16, 2010

(86) PCT No.: PCT/PT2010/000024
§ 371 (c)(1), (2), (4) Date: Mar. 9, 2012

(87) PCT Pub. No.: WO2010/147494
PCT Pub. Date: Dec. 23, 2010

(65) Prior Publication Data
US 2012/0182592 A1 Jul. 19, 2012

(30) Foreign Application Priority Data
Jun. 16, 2009 (PT) .................................. 104635

(51) Int. Cl.
*G02F 1/15* (2006.01)
(52) U.S. Cl.
CPC .................................. *G02F 1/1525* (2013.01)
USPC .......................................... 359/274; 359/269
(58) Field of Classification Search
CPC .............................................. G02F 1/15–1/155
USPC ................. 359/240, 245, 265, 266, 269, 274; 427/121
See application file for complete search history.

(56) References Cited

U.S. PATENT DOCUMENTS

| | | | |
|---|---|---|---|
| 2005/0179012 A1* | 8/2005 | Kwon et al. | 252/582 |
| 2011/0043886 A1* | 2/2011 | Jeon et al. | 359/273 |
| 2011/0293851 A1* | 12/2011 | Bollstrom et al. | 427/536 |

FOREIGN PATENT DOCUMENTS

JP     2010160223 A     7/2010     ............... G02F 1/15

OTHER PUBLICATIONS

Rosseinsky, D., et al., "Electrochromic Systems and the Prospects for Devices", Advanced Materials, vol. 13, No. 11; pp. 783-793.
Monk, P., et al., "Electrochromic Paper: Utility of Electrochromes Incorporated in Paper", Electrochica Acta, Elsevier Science Publishers, vol. 46, No. 13-14.
International PCT Search Report, PCT/PT2010/000024, 5 pages.

* cited by examiner

*Primary Examiner* — Darryl J Collins
*Assistant Examiner* — Gary O'Neill
(74) *Attorney, Agent, or Firm* — King & Spalding L.L.P.

(57) ABSTRACT

The present invention relates to electrochromic devices and methods for functionalizing cellulose-based materials, in production and post-production stages, in order to obtain solid-state electrochromic devices. The invention is in the field of electrochemistry. These functionalized cellulose-based materials have typical electrochromic characteristics, specifically the capacity to change the oxidation state, leading to a modification of the physical properties, shown by a color change when exposed to an electric potential difference, being this color change reversible. The color remains in the absence of any electric stimulus, demonstrating a memory effect. An example of an electrochromic device according to the present invention comprises a cellulose-based material soaked with a dispersion of electrochromic inorganic material nanoparticles or with a solution of electrochromic organic molecules, wherein the solution/dispersion contains at least one salt, and is finished by deposition of an electrode in each side of the cellulose-based material, wherein at least one of the electrodes is transparent.

21 Claims, 1 Drawing Sheet

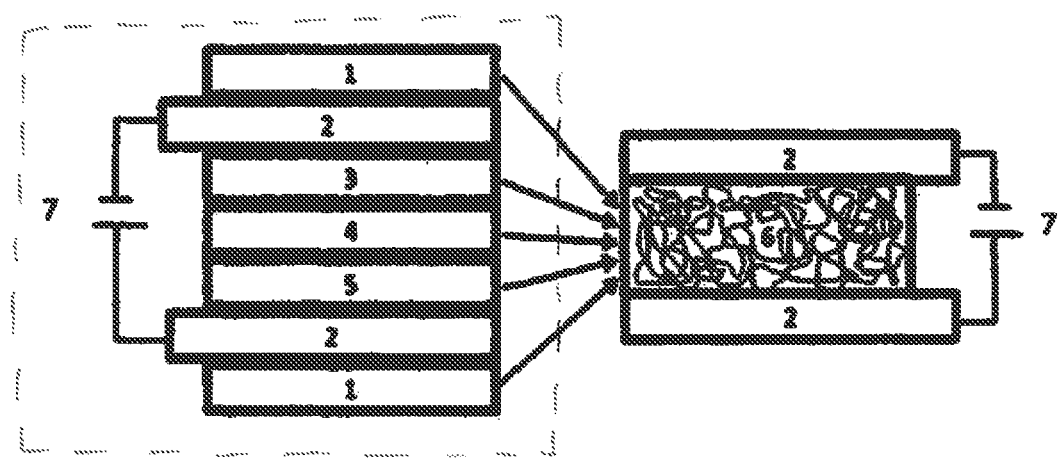

US 8,773,747 B2

ELECTROCHROMIC DEVICE AND METHOD FOR PRODUCING SAME

FIELD OF INVENTION

This disclosure refers to electrochromic devices and methods for functionalizing cellulose-based materials, in production and post-production stages, in order to obtain solid-state electrochromic devices.

The disclosure is in the field of electrochemistry.

PRIOR ART

Prior-art electrochromic devices are built mostly over glass and plastic substrates, being notably in use in contract building and automobile industry.

The following documents define the state-of-the-art for this disclosure:

Document US 2008/0297878 A1 refers to a device that includes a cellulose-based fibrous organic substrate that may function as high-storage, high-contrast and/or high-definition paper. Notwithstanding, structure, means and materials of the device are different from those in this disclosure.

Document CA 1076238 A1 uses a fibrous substrate only as a counter-electrode for electrochromic devices. This counter-electrode is made of fibrous pulp and carbon particles, making a carbon-reinforced fibrous sheet. This counter-electrode is not employed as a simultaneous substrate, electrochromic and electrolyte element.

Document JP 2007311333 A enables a cellulose separator doped with heavy metals for use in lead batteries. The function of the cellulosic material here is not the same as in this disclosure.

U.S. Pat. No. 6,489,051 B1 refers to a cellulosic matrix reinforced with carbon fibers that functions as collector of current in a fuel cell. The function of the cellulosic material here does not coincide with that in this disclosure.

U.S. Pat. No. 7,270,880 B2 refers to a device which substrate is plastic, with the back of the screen being in the color white caused by the electrochromic material being adsorbed in inorganic nanoparticles (TiO2), such particles being deposited on a reflective film to enable contrast. Thus, both the technology and architecture of the utilized electrochromic cells are different from the ones in this disclosure.

Document US 20070076287 A1 refers to a device in which the substrate is photographic paper, thus coated paper, and the structure is horizontal, i.e., the electrochromic and the counter-electrode are the same material and are deposited in the same plane, one to the side of the other, the electrolyte establishing an ionic bridge thereinbetween. The planar structure of the device is different from that in this disclosure, and implies that a part of the coloring is always visible, whilst the image does not possess a completely transparent state.

SUMMARY OF THE INVENTION

This disclosure refers to electrochromic devices and methods for producing electrochromic devices.

In face of the state-of-the-art, this disclosure makes the construction of an electrochromic device simpler, by reducing the number of layers relative to the electrochromic devices in the state-of-the-art, and it also makes the construction of an electrochromic device quicker and less costly, by virtue of diminishing the number of necessary depositions to achieve the same electrochromic function of the prior art, in a manner unexpected to a professional possessing ordinary skill in the art.

This disclosure refers to an electrochromic device, characterized by having 3 layers, wherein 2 layers are electrodes and the remaining layer is formed of a cellulose-based material embedded of a solution/dispersion containing electrochromic, electrolytic and counter-electrode agents, in which the device changes its color in at least one of its sides by occurrence of electric stimuli, and maintains its color in the absence of electric stimuli.

In an aspect to this disclosure, the electrochromic device is characterized in at least one of its electrodes being transparent.

In a further aspect to this disclosure, the electrochromic device is characterized in the electrodes being of a material selected from the group consisting of IZO, ITO, FTO, FZO, AZO and ATO.

In a yet further aspect to this disclosure, the electrochromic device is characterized in the cellulose-based material being paper.

In still another aspect, the electrochromic device of this disclosure is characterized in the solution/dispersion comprehending, as electrochromic agent, nanoparticles from inorganic oxides, non-oxide inorganic materials, or organic materials, or their combinations.

In a further aspect, the electrochromic device of this disclosure is characterized in the inorganic oxide nanoparticles being selected from the group consisting of:

other metals, selected from the group consisting of SnO, $Bi_2O_3$ and $Pb_3O_4$;

transition metals, selected from the group consisting of $WO_3$, $TiO_2$, $MoO_3$, NiO, $V_2O_5$, $Fe_2O_3$, $Ta_2O_5$, $CR_2O_3$, $MnO_2$, $FeO_2$, $CoO_2$, $RhO_2$, $IrO_2$ and $Nb_2O_5$;

lanthanides, selected from the group consisting of $CeO_2$, $Nd_2O_3$, $Dy_2O_3$, and $E_{r2}O_3$;

their combinations, selected from the group consisting of $WO_3$—$TiO_2$, $WO_3$—$TiO_2$—$MoO_3$, $CeO_2$—$SnO_2$; and polyoxometalates.

In a further aspect, the electrochromic device of this disclosure is characterized in the nanoparticles of non-oxide inorganic materials being selected from the group consisting of Prussian blue, β-zirconium chloride-nitride, Tungsten sulphide phosphotungstic acid, Indium nitride, Tin nitride, graphite and metal-doped polymers.

In a further aspect to this disclosure, the electrochromic device is characterized in the organic materials being selected from the group consisting of:

conductive polymers, selected from the group consisting of polyanilines and polythiophenes;

metallophtalocyanines; and viologens.

In a further aspect to this disclosure, the electrochromic device is characterized in comprehending PEDOT:PSS as a conductive polymer.

In yet another further aspect to this disclosure, the electrochromic device is characterized in the solution/dispersion containing as electrolytic agent a salt selected from the group consisting of $LiClO_4$, $ZnCl_2$, $LiBf_4$, $LiAsF_6$, LiT, LiI, LiBr, $LiCF_3SO_3$, $KYF_4$, $KNO_3$, $KBrO_3$, KI, $KBF_4$, KOH, KSCN, $K_2Cr_2O7$, KCl, $KCH_3CO_2$, $NH_4SCN$, $NH_4CH_3CO_2$, $NH_4Br$, $NH_4Cl$, NaSCN, $NaPF_6$ and $NaYF_4$.

The device of this disclosure is furthermore characterized in the solution/dispersion containing, as electrochromic agent, $WO_3$ and, as electrolytic agent, $LiClO_4$.

This disclosure refers still to a method for producing electrochromic devices, characterized in containing the following steps:

immersing a cellulose-based material in a solution/dispersion containing electrochromic, electrolytic and counter-electrode agents;

drying the cellulose-based material;

depositing an electrode on each side of the cellulose-based material, wherein at least one electrode is transparent.

In another aspect, the method is characterized in the cellulose-based material being paper pulp.

In another aspect to this disclosure, the method is characterized by the solution/dispersion containing, as electrochromic agent, nanoparticles of inorganic oxides, non-oxide inorganic materials or organic materials, or their combinations.

In yet another aspect, the method of this disclosure is characterized in the nanoparticles being selected from the group consisting of:

other metals, selected from the group consisting of $SnO$, $Bi_2O_3$ and $PB_3O_4$;

transition metals, selected from the group consisting of $WO_3$, $TiO_2$, $MoO_3$, $NiO$, $V_2O_5$, $Fe_2O_3$, $Ta_2O_5$, $CR_2O_3$, $MnO_2$, $FeO_2$, $CoO_2$, $RhO_2$, $IRO_2$ and $Nb_2O_5$;

lanthanides, selected from the group consisting of $CeO_2$, $Nd_2O_3$, $Dy_3$ and $Er_2O_3$;

their combinations, selected from the group consisting of $WO_3$—$TiO_2$, $WO_3$—$TiO_2$—$MoO_3$, $CeO_2$—$TiO_2$, $CeO_2$—$SnO_2$; and polyoxometalates.

In a further aspect to this disclosure, the method is characterized in the nanoparticles of non-oxide inorganic materials being selected from the group consisting of Prussian blue, β-zirconium chloride-nitride, Tungsten sulphide, phosphotungstic acid, Indium nitride, Tin nitride, graphite and metallic polymers.

In yet another aspect, the method of this disclosure is characterized in the organic materials being selected from the group consisting of:

conductive polymers, selected from the group consisting of polyanilines and polythiophenes;

metallophtalocyanines; and viologens.

In a further aspect to this disclosure, the method is characterized in containing PEDOT:PSS as conductive polymer.

In a further aspect, the method of this disclosures is characterized in the solution/dispersion containing as electrolytic agent a salt selected from the group consisting of $LiClO_4$, $ZnCl_2$, $LiBf_4$, $LiAsF_6$, $LiT$, $LiI$, $LiBr$, $LiCF_3SO_3$, $KYF_4$, $KNO_3$, $KBrO_3$, $KI$, $KBF_4$, $KOH$, $KSCN$, $K_2Cr_2O_7$, $KCl$, $KCH_3CO_2$, $NH_4SCN$, $NH_4CH_3CO_2$, $NH_4Br$, $NH_4Cl$, $NaSCN$, $NAPF_6$ and $NAYF_4$.

In a further aspect to this disclosure, the method is characterized in the electrodes being of a material selected from the group consisting of IZO, ITO, FTO, FZO, AZO and ATO.

In yet another aspect to this disclosure, the method is characterized in the solution/dispersion containing, as electrochromic agent, $WO_3$, and as electrolytic agent $LiClO_4$.

BRIEF DESCRIPTION OF THE DRAWINGS

Below this disclosure is described by divulging preferential embodiments which, together with the attached FIGURE, are not to be construed as limiting this disclosure, and in which:

FIG. 1 shows a schematic representation of an electrochromic structure comprised in the state-of-the-art, to the left, and of an exemplary structure to this disclosure, to the right, showing a reduction of 5 layers to 1.

DETAILED DESCRIPTION OF THE INVENTION

This disclosure is of the functionalization of cellulose-based materials for electrochromic applications, by employing an electrochromic solution/dispersion and its alteration for possessing internal electrolytic properties, and in the use of the resulting solution/dispersion for activation of the fibrous matrix of the cellulose-based materials, rendering them with electrochromic and electrolytic properties, reducing the deposition of layers over one, or between two, substrates, as comprised in the state-of-the-art (see FIG. 1).

In the device of this disclosure, the functionalized cellulose-based material displays 4 distinct functions, comprised in the electrochromic cells of the state-of-the-art:

1. substrate, partially or totally supporting an electrochromic device;
2. electrochromic, changing color with the application of electric potential;
3. electrolytic, facilitating the charge compensation through ionic migration, as a result of the application of electric potential; and
4. counter-electrode, functioning as redox pair of the electrochromic function.

Alternatively, the cellulose-based material can be functionalized by employing a solution/dispersion with solely electrolytic properties, displaying 2 functions:

1. substrate, partially or totally supporting an electrochromic device;
2. electrolytic, facilitating the compensation of charges through ionic migration, as a result of application of electric potential.

In this case, in order for the electrochromic device to be functional, the electrochromic material is deposited in one of the sides of the functionalized cellulose-based material, and the counter-electrode is deposited in the opposite side of the cellulose-based material.

An electrochromic material (3) is considered to be a compound that, in presence of electrical stimulus alters its oxidation state resulting in an alteration of its physical properties, shown through a change in color, which is kept even in the absence of any electrical stimulus, derived from possessing a memory effect, such alteration being reversible.

According to an aspect to this disclosure, the electrochromic solution/dispersion of this disclosure can consist of:

inorganic materials, selected from the group consisting of the following categories:

oxides:

other metals, e.g. $SnO$, $Bi_2O_3$, $Pb_3O_4$;

transition metals, e.g. $WO_3$, $TiO_2$, $MoO_3$, $NiO$, $V_2O_5$, $Fe_2O_3$, $Ta_2O_5$, $Cr_2O_3$, $MnO_2$, $FeO_2$, $CoO_2$, $RhO_2$, $IrO_2$, $Nb_2O_5$;

lanthanides, e.g. $CeO_2$, $NdO_3$, $DyO_3$, $ErO_3$;

or their combinations, e.g. $WO_3$—$TiO_2$, $WO_3$—$TiO_2$, $MoO_3$, $CeO_2$—$TiO_2$, $CeO_2$—$SnO_2$;

polyoxometalates, e.g. polyoxotungstates; and non-oxides, e.g. Prussian blue, β-zirconium chloride-nitride; Tungsten sulphide, phosphotungstic acid, Indium nitride, Tin nitride, graphite, metal-doped polymers; and organic materials, selected from the group consisting of the following categories:

conductive polymers, e.g. polyanilines and polythiophenes such as PEDOT:PSS;

metallophtalocyanines; and viologens.

The electrochromic devices also require the presence of an electrolytic material, ionically conductive (4). This material operates the compensation of charges in the process of oxidation or reduction of the electrochromic material, through the migration of ionic species.

According to another aspect to this disclosure, to achieve electrochromic function, a salt is added to the electrochromic solution/dispersion, selected from the group consisting of $LiClO_4$, $ZnCl_2$, $LiBf_4$, $LiAsF_6$, LiT, LiI, LiBr, $LiCF_3SO_3$, $KYF_4$, $KNO_3$, $KBrO_3$, KI, $KBF_4$, KOH, KSCN, $K_2Cr_2O_2$, KCl, $KCH_3CO_2$, $NH_4SCN$, $NH_4CH_3CO_3$, $NH_4Br$, $NH_4Cl$, NaSCN, $NaPF_6$, and $NaYF_4$.

In prior art, electrochromic devices include still a layer of counter-electrode, also named ion storage layer (5). These substances function as the REDOX pair (reduction-oxidation) of the electrochromic material, since they are reduced when the electrochromic material oxides and vice-versa.

In another aspect to this disclosure, the electrochromic material is also the counter-electrode, resulting in the color change in a side of the cellulose-based material being inverse to the change of color in the other side, following the polarity of the applied difference of electric potential.

This disclosure also employs two electrodes, from which at least one is transparent (2), which allow the application of electric potential.

The electrodes are connected to an external power source through which a difference of electric potential is applied to the device. By application of the electric potential, the electrochromic material is oxidized in one of its sides and reduced in the other side. Simultaneously, the ions from the salt migrate through the cellulosic matrix, performing charge compensation. By reversing the polarity of the applied electric potential, the same phenomenon occurs conversely in relation to the sides of the electrochromic material. Coloring is thus alternately displayed on the sides of the device as a result of the polarity of the applied electric potential.

In a preferential embodiment of this disclosure, sheets of cellulosic material are immersed in an electrochromic solution/dispersion which contains at least one salt, thereby achieving the simultaneous properties of: substrate, electrochemical, electrolytical and counter-electrode (6). Next the sheets are dried, followed by the application of an electrode to each sheet side, wherein at least one of the applied electrodes is transparent.

The sheet electrodes are connected to an external power source from which an electric potential is applied. By applying this electric potential, oxidation (loss of electrons) of the electrochromic material occurs in a first side of the sheet, and reduction (gain of electrons) of the electrochromic material occurs in a second side of the sheet. Simultaneously, the ions from the salt migrate through the cellulosic matrix to compensate charges. By reversing the polarity of the applied electric potential, oxidation of the electrode on the second side of the sheet occurs, and reduction of the electrode on the first side of the sheet occurs. Coloring is thus achieved alternately in the sides of the sheet as a result of the polarity of the applied electric potential.

In a further preferred embodiment of this disclosure, an electrochromic device is developed from a paper sheet, with a dispersion of Tungsten trioxide ($WO_3$) and Lithium perchlorate ($LiClO_4$) particles. No kind of pre-treatment or cleaning of the paper is necessary. It is necessary just that the substrate has adequate porosity, which paper has been verified to have. The sheet is completely immersed in the above-described dispersion/solution for 1-10 minutes. Next, the sheet is dried at 60-100° C. for 1-5 minutes. A transparent conductive oxide: IZO—Indium Zinc Oxide, ITO—Indium Tin Oxide, FTO— Fluorine-doped Tin Oxide, FZO—Fluorine-doped Zinc Oxide, AZO—Aluminum-doped Zinc Oxide, or ATO—Aluminum-doped Tin Oxide, is deposited to both sides of the paper. It is so obtained a functional electrochromic device which, excluding power source, is made of only 3 layers.

In another preferential embodiment of this disclosure, an electrochromic solution/dispersion and at least one salt are added to paper pulp in the additivation phase of the production process for paper, immediately prior to the phases of drying and pressing. After the production process is complete, an electrode is deposited on each of the sides of the produced paper sheets, wherein at least one electrode is transparent.

In another preferred embodiment of this disclosure, the solution/dispersion can be merely electrolytic, the cellulose-base material working just as substrate and electrolyte, and its functioning further requiring the deposition of the electrochromic and counter-electrode materials in opposite sides of the cellulose-based material, further to both electrodes.

Although the active function of the cellulosic materials foreseen in this disclosure is the electrochromic function, it may happen that other forms of chromism, including thermochromism, photocromism, solvatochromism, ionochromism, halochromism, tribochromism, and piezochromism are observed.

The above preferential embodiments are presented as illustrations of this disclosure, and should not be interpreted as limiting the scope of this disclosure. Other aspects and forms of implementation illustrative of this disclosure will be obvious to experts in the state-of-the-art from this disclosure and/or from practice of this disclosure.

The invention claimed is:

1. Electrochromic device, comprising:
   three layers including:
      two electrode layers, and
      a single integrated electrochemic, electrolytic, counter-electrode layer between the two electrode layers, the single integrated layer comprising cellulose-based material embedded in a solution/dispersion containing electrochromic, electrolytic, and counter-electrode agents,
   wherein the electrochromic device changes color, which is visible through at least one of the electrode layers, in the presence of electric stimulus, and maintains a constant color in the absence of electric stimulus.

2. Electrochromic device according to claim 1, wherein one of the electrodes is transparent.

3. Device according to claim 1, wherein the electrodes are of a material selected from the group consisting of IZO, ITO, FTO, FZO, AZO and ATO.

4. Electrochromic device according to claim 1, wherein the cellulose-based material is paper.

5. Device according to claim 1, wherein the solution/dispersion contains, as electrochromic agent, nanoparticles of inorganic oxides, nanoparticles of inorganic non-oxide materials or nanoparticles of organic materials, or their combinations.

6. Device according to claim 5, wherein the nanoparticles of inorganic oxides are selected from the group consisting of other metals, selected from the group consisting of SnO, Bi2O3 and Pb3O4; transition metals, selected from the group consisting of WO3, TiO2, MoO3, NiO, V2O5, Fe2O3, Ta2O5, Cr2O3, MnO2, Fe)2, CoO2, RhO2, IrO2 and Nb2O5; lanthanides, selected from the group consisting of CeO2, Nd2O3, Dy2O3 and Er23; their combinations, selected from the group consisting of WO3-TiO2, WO3-TiO2-MoO3, Ce02-Ti02, Ce02-Sn02; and polyoxometalates.

7. Device according to claim 5, wherein the nanoparticles of non-oxide inorganic materials are selected from the group consisting of Prussian blue, β1-zirconium chloride-nitride, Tungsten sulphide, phosphotungstic acid, Indium nitride, Tin nitride, graphite and metallic polymers.

8. Device according to claim 5, wherein the organic materials are selected from the group consisting of conductive polymers, selected from the group consisting of polyanilines and polythiophenes; metallophtalocyanines; and viologens.

9. Device according to the claim 8, wherein the conductive polymer is PEDOT:PSS.

10. Device, according to claim 1, wherein the solution/dispersion includes as electrochromic agent a salt selected from the group consisting of LiCl4, ZnCl2, LiBf4, LiAsF6, LiT, LiBr, LiCF3SO3, KYF4, KNO3, KBrO3, KI, KBF4, KOH, KSCN, K2Cr2O7, KCl, KCH3CO2, NH4SCN, NH4CH3CO2, NH4Br, NH4Cl, NaSCN, NaPF6 and NaYF4.

11. Device according to claim 1, wherein the solution/dispersion includes, as electrochromic agent WO3 and as electrolytic agent LiClO4.

12. Method for the production of an electrochromic device having three layers, including two electrode layers and a third layer comprising cellulose-based material embedded of a solution/dispersion containing electrochromic, electrolytic and counter-electrode agents, wherein the electrochromic device changes color in at least one of its sides in the presence of electric stimulus and maintains color in the absence of electric stimulus, the method comprising:
forming an integrated electrochemic, electrolytic, counter-electrode layer by:
immersing a cellulose-based material in a solution/dispersion including simultaneously electrochromic, electrolytic and counter-electrode agents; and
drying the cellulose-based material; and
depositing an electrode directly on each side of the integrated electrochemic, electrolytic, counter-electrode layer formed from the cellulose-based material, wherein at least one electrode is transparent.

13. Method according to claim 12, wherein the cellulose-based material is paper pulp.

14. Method according to claim 12, wherein the cellulose-based material is paper.

15. Method according to claim 12, wherein the solution/dispersion includes as electrochromic agent nanoparticles of inorganic oxides, nanoparticles of non-oxide inorganic materials, nanoparticles of organic materials, or their combinations.

16. Method according to claim 15, wherein nanoparticles of inorganic oxides are selected from the group consisting of: other metals, selected from the group consisting of SnO, Bi2O3 and Pb3O4; transition metals, selected from the group consisting of WO3, TiO2, MoO3, NiO, V2O5, Fe2O3, Ta2O5, Cr2O3, MnO2, FeO2, CoO2, RhO2, IrO2 and Nb2O5; lanthanides, selected from the group consisting of CeO2, Nd2O3, Dy2O3 and Er2O3; their combinations, selected from the group consisting of WO3-TiO2, WO3-TiO2-MoO3, CeO2-TiO2, CeO2-SnO2; and polyoxometalates.

17. Method according to claim 15, wherein the nanoparticles of non-oxide inorganic materials are selected from the group consisting of Prussian blue, β-zirconium chloride-nitride, Tungsten sulphide, phosphotungstic acid, Indium nitride, Tin nitride, graphite and metal-doped polymers.

18. Method according to claim 15, wherein the organic materials are selected from the group consisting of: conductive polymers, selected from the group consisting of polyanilines and polythiophenes; metallophtalocyanines; and viologens.

19. Method according to the claim 18, wherein the solution/dispersion includes as electrolytic agent a salt selected from the group consisting of LiClO4, ZnCl2, LiBf4, LiAsF6, LiT, LiI, LiBr, LiCF3SO3, KYF4, KNO3, KBrO3, Ki, KBF4, KOH, KSCN, K2Cr2O7, KCl, KCH3CO2, NH4SCN, NH4CH3CO2, NH4Br, NH4Cl, NaSCN, NaPF6 and NaYF4.

20. Method according to claim 12, wherein the electrodes are of a material from the group consisting of IZO, ITO, FTO, FZO, AZO and ATO.

21. Method, according to claim 12, wherein the solution/dispersion includes, as electrochromic agent, WO3 and, as electrolytic agent, LiClO4.

\* \* \* \* \*